UNITED STATES PATENT OFFICE.

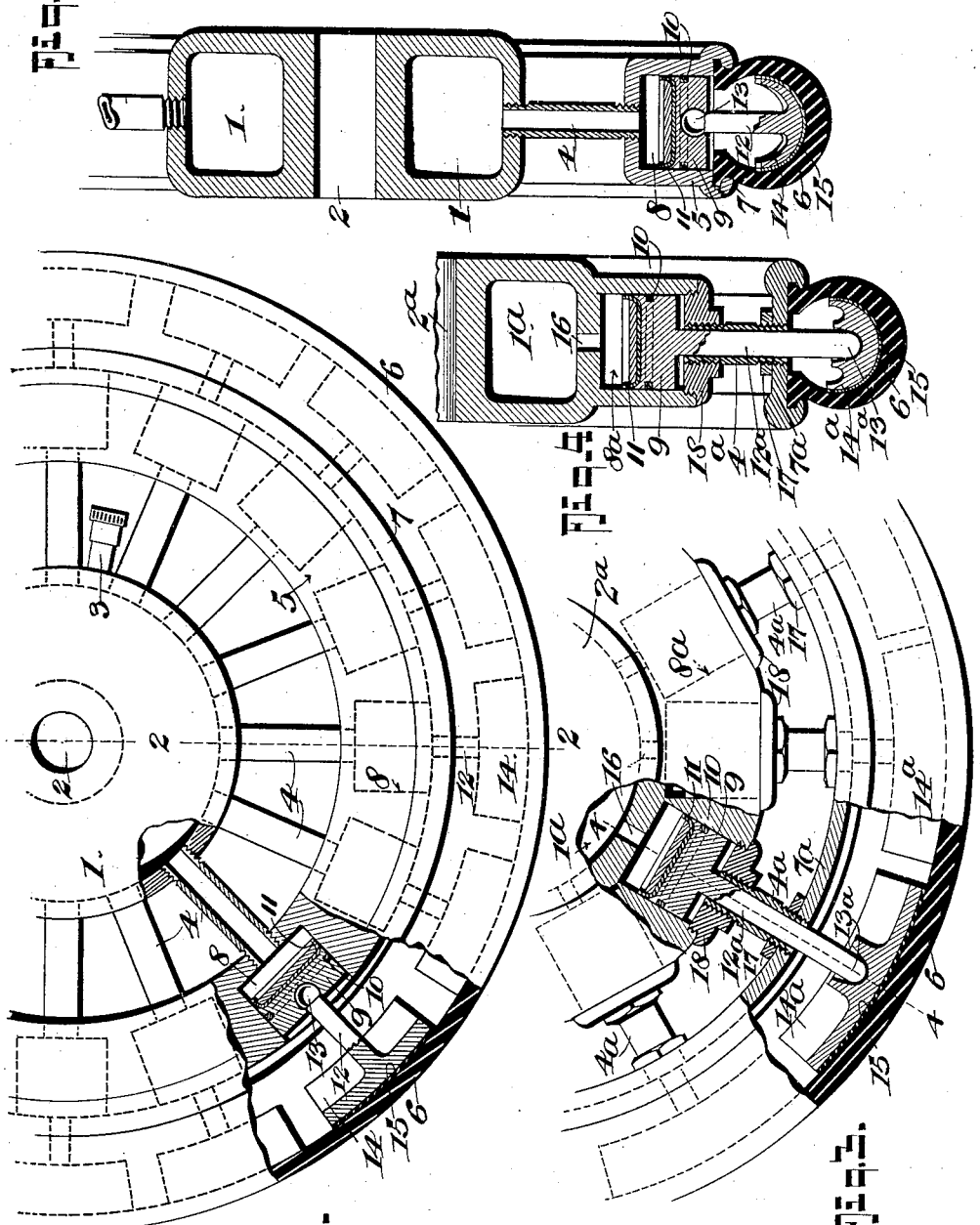

HENRY SHARE BAUMAN, OF NASHVILLE, TENNESSEE.

RESILIENT WHEEL.

1,334,128.  Specification of Letters Patent.  Patented Mar. 16, 1920.

Application filed May 4, 1915. Serial No. 25,719.

*To all whom it may concern:*

Be it known that I, HENRY S. BAUMAN, a citizen of the United States, and a resident of Nashville, in the county of Davidson and State of Tennessee, have invented a certain new and useful Improvement in Resilient Wheels, of which the following is a specification.

My invention is a resilient wheel, and has for its object to provide a wheel in which the required resiliency is acquired without the use of ordinary pneumatic inner tubes which are objectionable in that they are subject to punctures and blow outs.

A further object of my invention is to provide a wheel in which an ordinary outer casing or tire may be used, held extended by a series of shoes within the casing cushioned by air confined within the hub.

A still further object of my invention is to provide a wheel of durable construction by preventing the overheating of the tire casing, and by reducing friction by making possible the use of a much smaller tire casing than is at present used.

My invention is illustrated in the accompanying drawings forming a part of this specification in which like reference characters indicate like parts.

Figure 1 is a side elevation partly in section of a wheel embodying one form of my invention.

Fig. 2 is a sectional view taken on the line 2—2 of Fig. 1.

Fig. 3 is a side elevation partly in section of a wheel embodying another form of my invention.

Fig. 4 is a sectional view taken on line 4—4 of Fig. 3.

Referring to the form shown in Figs. 1 and 2, an air chamber 1 is formed in the hub 2 of the wheel. This chamber is filled with air through an air valve 3 of ordinary construction. Hollow spokes 4 in communication with the air chamber extend radially from the hub. The outer ends of the spokes are secured in a felly 5 having a rim 7 which grips a tire casing 6 of ordinary construction. A cylindrical recess 8 is bored in the felly opposite each spoke so that the spoke opens into the cylinder. Within each cylinder is a piston 9 having a packing ring 10, and a leather convex cap 11 on the face of the piston to make an air tight joint. A piston rod 12 is secured to the piston by a ball and socket joint 13. The outer end of the piston rod is enlarged to form a convex shoe 14 fitting the inner surface of the tire casing 6. The shoe is faced with soft rubber 15 to prevent chafing and wear.

In the form shown in Figs. 3 and 4, the cylinders 8$^a$ are bored in the hub 2$^a$ and communicate with the air chamber 1$^a$ through openings 16. The piston rods 12$^a$ which reciprocate through hollow spokes 4$^a$ are made integral with the piston heads, and are secured at their outer ends to the shoes 14$^a$ by ball and socket joints 13$^a$. The hollow spokes 4$^a$ are secured at the outer end to the rim 7$^a$ by jam nuts 17 and are threaded at the inner end into the cylinder heads 18.

In operation any unevenness in the road acting against the tire casing, will force one shoe, piston rod, and piston head inwardly. The movement of the piston head will tend to force the other shoes outwardly through the medium of the air in the hollow hub. The tire casing however, will resist this outward movement and the air in the hollow hub will therefore be compressed, forming a cushioning means similar in operation to the standard pneumatic tire.

In the form shown in Fig. 3, the opening 16 will act as a choke to prevent a too rapid compression of the air, this opening being of such size as is shown by experience to be most desirable. The hollow spokes in the form shown in Fig. 1 answer the same purpose. The necessary amount of lubricating oil is put into the air chamber. This acts as a lubricant and also as a packing for the piston heads.

The wheel is made of metal throughout, and the parts are hollow wherever practical to be made so, thus making possible a light but durable construction.

The wheel being hollow and of metal, acts as a radiator of the heat generated by the friction of the tire, thus keeping the tire cool and adding to its wearing qualities. By dispensing with the use of inner tubes a much smaller tire casing can be used for the same weight car on my wheel than on one of standard type, thus reducing friction.

I claim:—

A wheel of the character specified, comprising a hollow hub, radially extending air vents, cylinders communicating with the air vents, cylinder heads, hollow spokes secured to the cylinder heads, a rim, jam nuts securing the outer ends of the spokes to the rim, a tire casing on the rim, convex bearing shoes within the casing, wear preventing material on the convex faces of the shoes, sockets integral with the shoes, piston rods within the hollow spokes, bearing heads on the piston rods engaged by the sockets, pistons within the cylinders, and convex packing cups on the faces of the pistons.

HENRY SHARE BAUMAN.

Witnesses:
S. E. Cox,
Jas. J. Dalton.